United States Patent

[15] 3,654,665

Holly

[45] Apr. 11, 1972

[54] MOLDING DEVICE FOR PLASTIC MATERIAL

[72] Inventor: James A. Holly, Richton Park, Ill.

[73] Assignee: Hollymatic Corporation

[22] Filed: Apr. 9, 1970

[21] Appl. No.: 26,814

[52] U.S. Cl. .................................................. 17/32
[51] Int. Cl. .................................................. A22c 7/00
[58] Field of Search ...................................... 17/32

[56] References Cited

UNITED STATES PATENTS 3,241,178   3/1966   Bridge, Jr. ................................... 17/32
3,417,425   12/1968  Holly ........................................... 17/32

Primary Examiner—Lucie H. Laudenslager
Attorney—Hofgren, Wegner, Allen, Stellman & McCord

[57] ABSTRACT

A molding apparatus for forming articles and specifically patties from a moldable material and specifically ground meat, fish or the like in which a plurality of articles are formed simultaneously by providing a movable mold having a plurality of mold openings therein, a hopper for retaining a supply of the moldable material and a plurality of feeders in the bottom section of the hopper movable toward and away from a fractional number of the passages leading to the mold openings when the mold is in material receiving position and with force means for moving the feeders toward and away from the passage means for filling the mold openings. The invention also includes a partition dividing the bottom section of the hopper into a plurality of separate parts, a feeder in the bottom section for forcing material therefrom into a mold opening and an agitator in the plurality of separate bottom parts movable to dislodge material from the adjacent portions of the hopper for increasing efficiency in feeding the material from the hopper into the mold openings. The invention also includes a pair of rotatable movers in the hopper on opposite sides of the feeder with these mover devices being rotatable toward the feeder for dislodging the moldable material and urging it toward the feeder.

11 Claims, 4 Drawing Figures

PATENTED APR 11 1972

INVENTOR,
JAMES A. HOLLY

BY Hofgren, Wegner, Allen,
Stillman & McCord.

ATTORNEYS.

3,654,665

MOLDING DEVICE FOR PLASTIC MATERIAL

BACKGROUND OF THE INVENTION

This invention relates to molding apparatus particularly for forming articles such as patties from plastic material such as ground food material in which a number of the articles are produced simultaneously. The invention is related to my prior U.S. Pat. No. 3,417,425 dated Dec. 24, 1968 and assigned to the same assignee as the present invention. In both this prior patent and the present invention the moldable material is forced from a hopper by a reciprocable feeder by arranging a mold opening in a movable mold in position to receive material from the hopper. The mold is then moved to ejecting position where the mold opening with the contained material is exposed for removal of the thusly formed article.

The invention described and claimed herein is an improvement over the structures shown in prior U.S. Pat. Nos. 1,171,937; 3,203,037; 3,416,187 and 3,490,093.

In the present application the apparatus is designed specifically for forming a desired plurality of the articles such as patties simultaneously. In this invention the mold contains a plurality of mold openings for simultaneously forming a plurality of molded articles. There are also provided a plurality of feeder means in a bottom section of the hopper each movable toward and away from a fractional number of the passages leading from the hopper to the mold for forcing material from the hopper into the mold openings when the openings are in communication with the hopper or, in other words, when the movable mold has been moved to this position.

SUMMARY OF THE INVENTION

One of the features of this invention is to provide an improved molding apparatus for molding a plurality of articles simultaneously in which a plurality of feeders operating in a bottom section of a hopper are each movable toward and away from a fractional number of passages leading from the hopper to the mold openings when the mold is in material receiving position.

Another feature of the invention is to provide a molding apparatus for simultaneously forming a plurality of molded articles and having partition means dividing the bottom section of the hopper into a plurality of separate parts and agitator means in the bottom section parts adjacent the movable feeder in the hopper bottom section in which the agitator is movable to dislodge the movable material from adjacent portions of the hopper. Each of the separate bottom section parts contains its own agitator for efficient dislodging of the material.

A further feature of the invention is to provide a molding apparatus having a pair of rotatable mover devices in the hopper adjacent to and on opposite sides of a feeder means and operating means for rotating these devices toward the feeder for dislodging the material and urging it toward the feeder and an agitator means between the mover devices and adjacent the feeder means to aid further in supplying the material to the feeder.

DESCRIPTION OF THE PREFERRED EMBODIMENT

Figure 1:
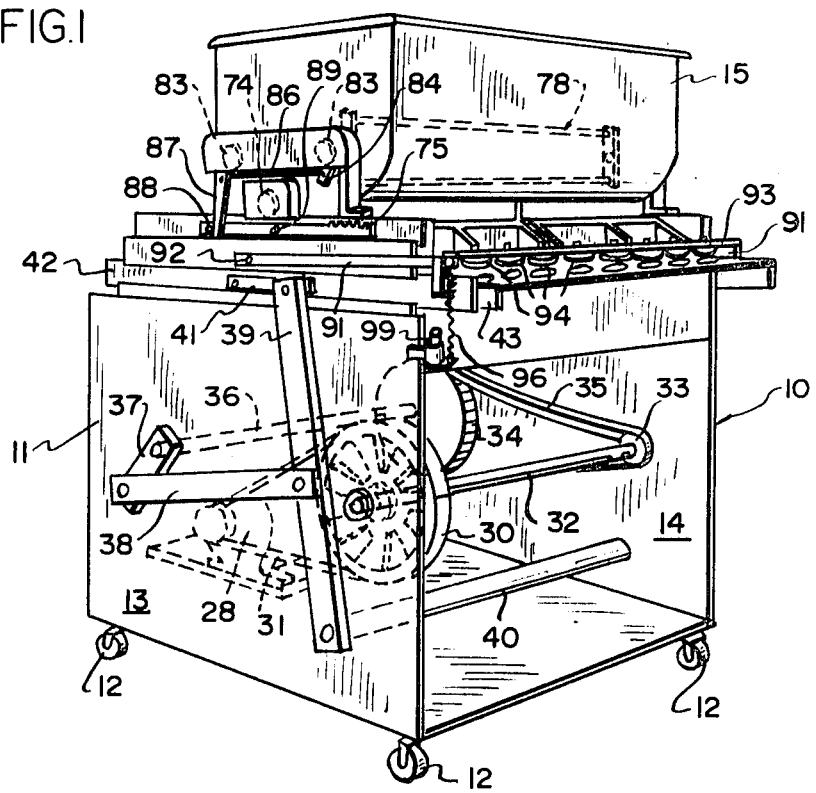
FIG. 1 is a perspective view illustrating a molding apparatus embodying the invention.

In the embodiment illustrated in the accompanying drawings the molding apparatus 10 comprises a cabinet 11 supported on casters 12 and including side walls 13 and 14.

Located on top of the cabinet 11 is a material receiving hopper 15 which in the illustrated embodiment is for receiving ground meat, ground fish or other subdivided food material particularly of an adhesive nature. This hopper has a bottom section 16 that is divided into a plurality of separate parts 17, here shown as two, by transverse partitions 26.

Located beneath the hopper 15 is a horizontally reciprocable mold plate 18 having a plurality, here shown as 8, of mold openings 19 therein.

Figure 4:
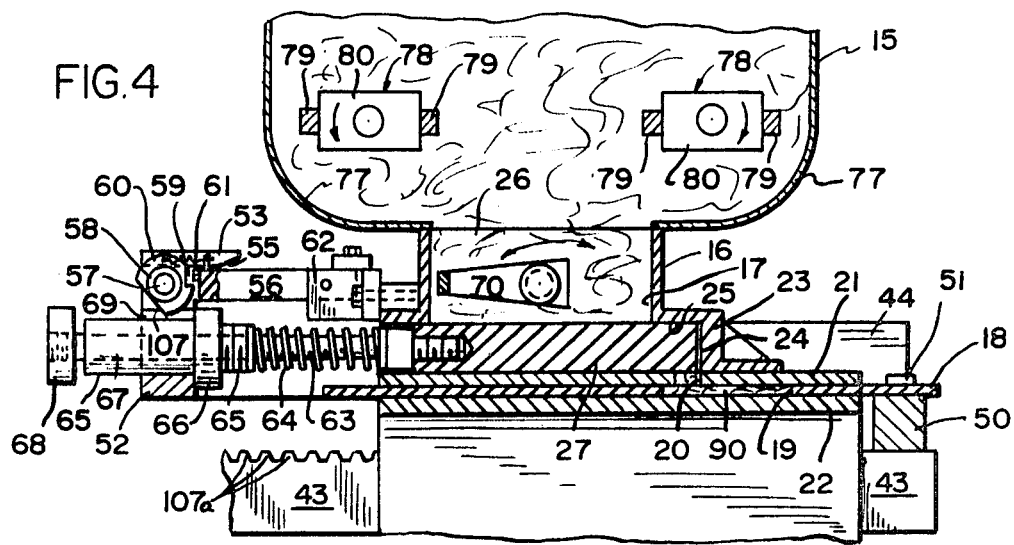
FIG. 4 is a fragmentary sectional view taken substantially along line 4—4 of FIG. 3.

Communicating with the bottom section 16 of the hopper 15 are a plurality of access passages 20 with the illustrated embodiment having one passage 20 for each mold opening 19. As can be seen in FIG. 4 the access passages or fill slots are located in a horizontal plate 21 beneath which the mold plate 18 is held for horizontal reciprocation. The bottom of the mold plate 18 is supported on a base plate 22 that is held by the top of the cabinet 11.

The bottom section 16 of the hopper 15 is provided with a forward step portion 23 that provides a front cavity 24. As can be seen in FIG. 4 the front end of this cavity 24 is directly above and therefore leads to the plurality of fill slots 20.

In the extreme bottom part 25 that contains the front cavity 24 there is located a plurality of feeder means in the form of horizontally reciprocable rams 27. In the illustrated embodiment there are two of these rams 27 arranged side-by-side on opposite sides of the bottom partition 26. Each ram 27 is mounted in this bottom part 25 of the hopper immediately above the fill slot plate 21 for reciprocation toward and away from the fill slots to force moldable material such as ground beef therethrough into the plurality of mold openings 19 simultaneously when the mold 18 has been moved to a position of registry with the slots 20 as illustrated in the drawings.

Each ram 27 is movable toward and away from a fractional number of the total passage means or fill slots 20. In the illustrated embodiment there are eight of these fill slots and correspondingly eight mold openings and each ram 27 is used to fill one-half or four of this total of mold openings simultaneously.

The driving power for the mold plate 18 as well as the feeder rams 27 comprises an electric motor 28 positioned in the bottom of the cabinet 11 which drives a pulley 30 by means of a belt 31.

The pulley 30 is mounted on a shaft 32 for rotation thereof with the shaft extending horizontally between the side walls 13 and 14. The rotation of the shaft 32 drives a speed reduction gearing arrangement including a small sprocket 33 on the shaft 32 and a large sprocket 34 spaced therefrom and connected by a drive chain 35 to the small sprocket 33.

The large sprocket 34 is mounted on a second horizontal transverse shaft 36 also extending between the side walls 13 and 14 with this shaft connected to an external rotatable linkage arm 37 that is rotatably connected to a reciprocable second linkage arm 38. This second arm 38 in turn is connected to a third linkage arm 39 which is reciprocable on a cross shaft 40 in the bottom of the cabinet 11 and extending between the side walls 13 and 14.

As can be seen in FIG. 1 the shafts 32, 36 and 40 are parallel to each other with the shaft 40 being located at the bottom of the cabinet 11 and being connected to the bottom end of the generally vertically extending linkage arm 39.

Figure 2:
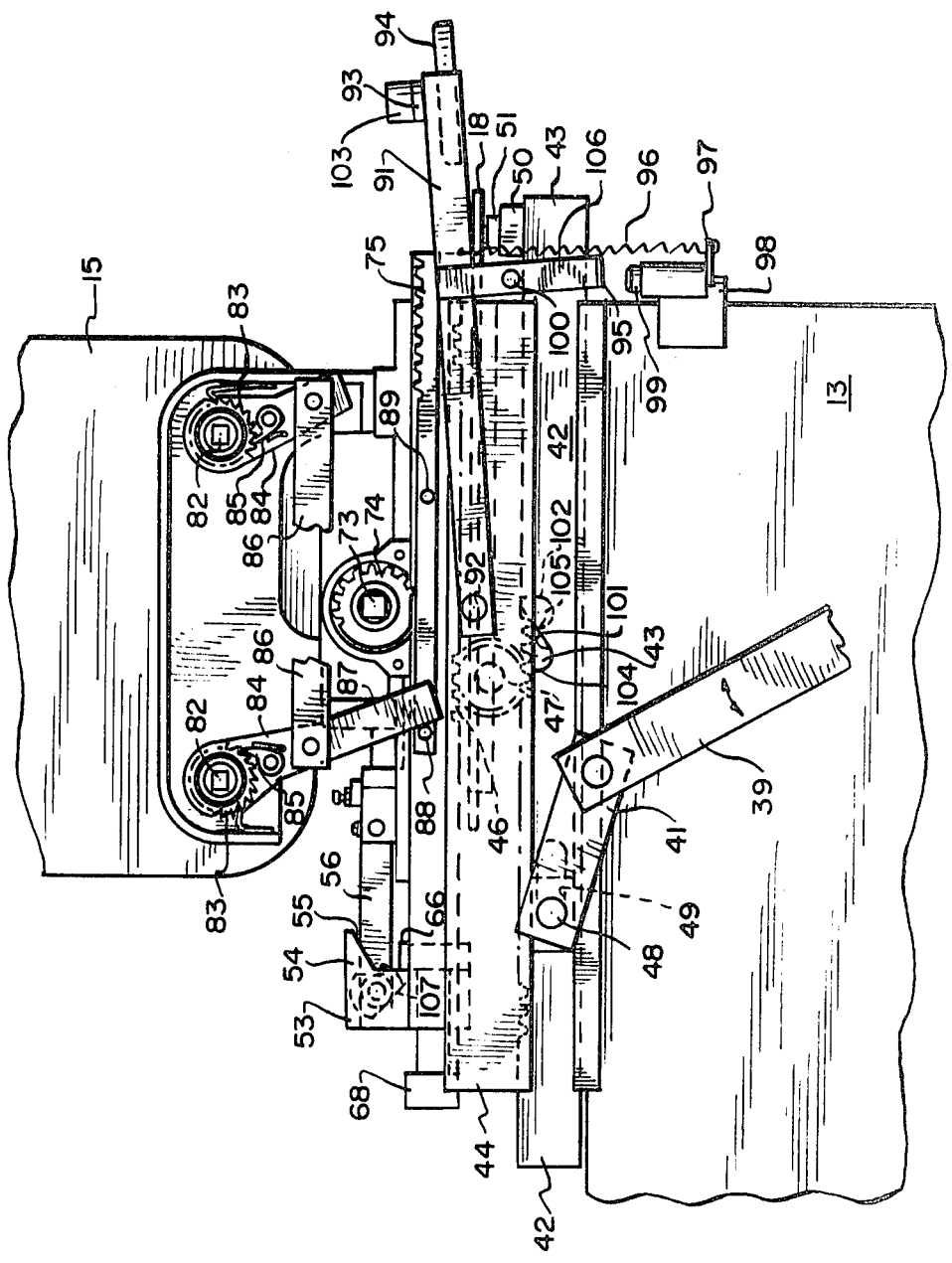
FIG. 2 is a fragmentary side elevational view partially broken away for clarity of illustration of the apparatus of FIG. 1.

The upper end of this arm 39 which is shown in reduced size in FIG. 2 for clarity of illustration is attached to the forward end of the generally horizontal link 41. The rear end of this link 41 is connected to a side cam plate 42 inwardly of which is located an elongated horizontal rack 43.

This rack 43 is provided with upwardly facing teeth 107a. In the illustrated embodiment there are provided a pair of these horizontal racks 43 on opposite sides of the hopper and located immediately above each of these first racks 43 is a second rack 45 the teeth 46 of which face downwardly. Engaging the opposed teeth of each pair of vertically aligned racks 43 and 45 is a pinion gear 47. With this arrangement when the bottom racks 43 are moved to the right as viewed in FIGS. 2 and 4 the top racks 45 are moved to the left, and vice versa. This rack and pinion arrangement is substantially the same as illustrated in the above prior U.S. Pat. No. 3,417,425.

The link 41 on its rear end, which is opposite the end connected to the linkage arm 39, carries an inwardly extending pin 48 which extends through the cam plate 42 to engage a horizontal slot 49 in the bottom rack 43. These bottom racks 43 carry at their forward ends a cross bar 50 to which is attached as by means of spaced bolts 51 the forward end of the centrally divided mold plate 18 which in effect is in the form of two side-by-side sub-plates (FIG. 3) each attached to the cross bar 50 by a pair of the bolts 51. As the bottom racks 43 are reciprocated horizontally by the drive pin 48 connected thereto they carry the mold plates 18 in horizontal reciprocation between an extreme retracted position as shown in the drawings and an extreme forward position where the mold openings are exposed for removal of their patty shaped contents in a manner to be described hereinafter.

The rear ends of the top racks 45 carry a cross bar 52 which operates to drive the feeder rams 27. This driving arrangement for each ram is essentially the same as that shown in my pending application No. 865,628, filed Oct. 13, 1969 and assigned to the same assignee as the present application.

The cross bar 52 carries two pairs of side-by-side spaced stop bars 53 each having an upwardly sloped front end 54 provided by an upwardly sloped bottom surface 55.

Just above the path of movement of each of the feeder rams 27 is a rearwardly extending latch bar 56. Each latch bar 56 carries at its rear end a transverse axle 57 on which is located a pair of opposite end rollers 58. Positioned within a slot 59 at the extreme rear end of each latch bar 56 and between the end rollers 58 is a rotatable catch 60. Each catch 60 in its slot 59 is urged in clockwise direction (as viewed in FIG. 4) by a spring 61 so that each catch 60 normally is held in the position shown in the drawings under the urging of its spring 61.

The front end of each latch bar 56 is hingedly mounted on its own bracket 62 attached to the rear of the hopper bottom 16 as shown in FIG. 4 for upward movement from its horizontal position shown. This hinge mounting for each bar 56 permits vertical movement of the bar when unrestrained by the side stop bars 53.

In order to provide a resilient drive for each feeder ram 27 there is provided a rearwardly extending drive bolt 63 on each ram 27 around which extends a helical spring 64 whose outer end bears against a tube 65 that is slidable on its bolt 63 and that carries a threaded collar 66 for adjustable mounting thereon. The rear end of each bolt beyond the tube 65 carries a button 68 that is larger than the tube 65. When the two springs 64 are in their fully extended position as illustrated in the drawings the collars 66 bear against the forward surfaces of the cross bar 52.

Figure 3:
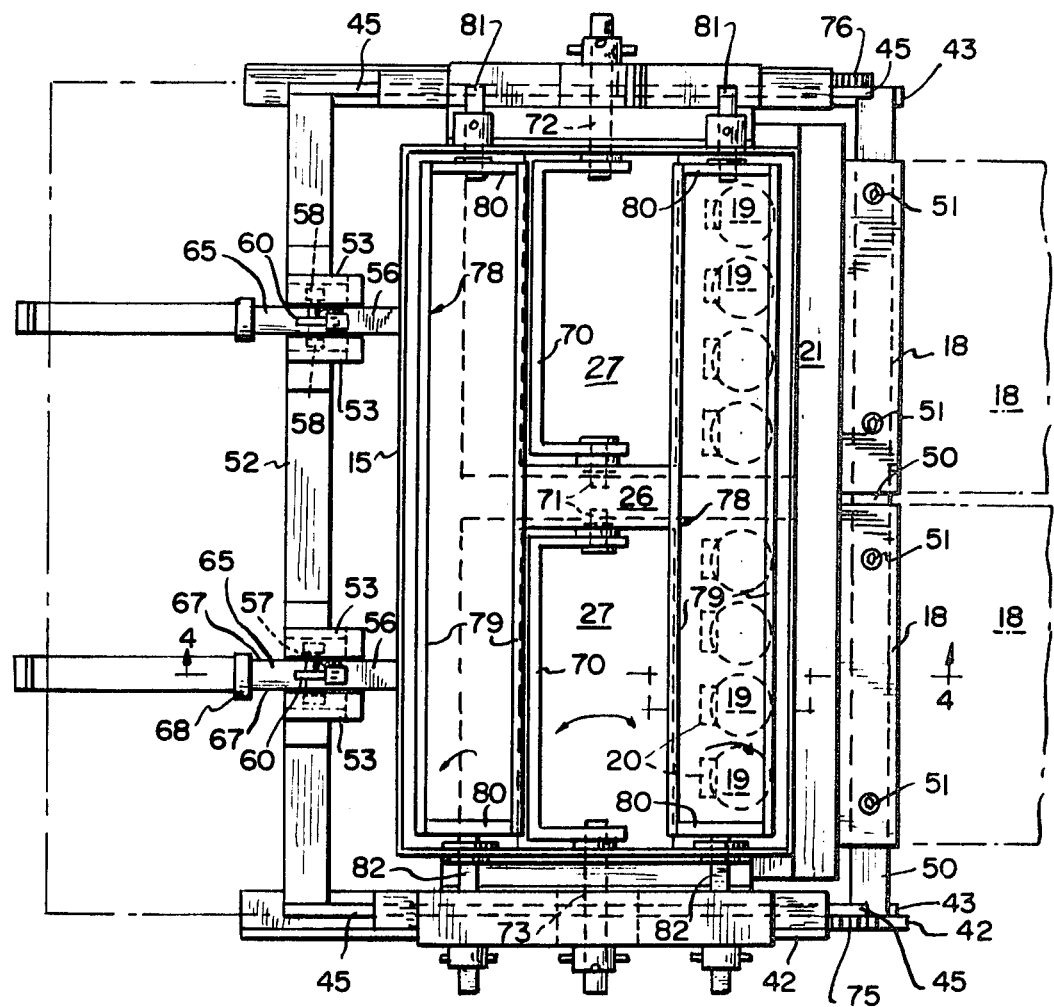
FIG. 3 is a plan view of the apparatus.

As can be seen in FIGS. 3 and 4 each latch bar 56 is located immediately above a bolt 63. Each tube 65 is provided with flattened sides 67 located in a notch 69 in the cross bar 52 so that the threaded collars 66 when in their rearmost positions bear against the front of the cross bar 52 and the front ends of the notches 69.

Positioned in the two separate parts 17 of the bottom section 16 of the hopper are arcuately reciprocable agitators 70 each in the form of a bail. The two agitators are each mounted at their adjacent ends on a bearing axle 71 with the opposite ends of the agitators each connected to similar axles 72 and 73 extending to the exterior of the apparatus. The three axles 71, 72 and 73 are aligned.

The axle 73 on the end that is opposite its agitator 70 carries a pinion gear 74 that engages a rack gear 75 that is mounted on the top of an upper drive rack 45. The opposite end axle 72 carries a similar pinion and its rack 76 is mounted on the other top drive rack 45.

As can be seen most clearly in FIGS. 3 and 4, the longitudinal bottom corners 77 of the hopper 15 on either side of the hopper bottom section 16 are rounded. These rounded bottom corners have mounted therein rotatable mover devices 78 with each comprising a pair of parallel rods 79 extending substantially the full length of the hopper 15 above the partition 26 and connected at their ends by parallel cross bars 80. One end of each device 78 is mounted on an axle 81 that is rotatably held in a bearing and the other end of each device 78 is mounted on a similar axle 82 with each pair of axles 81 and 82 for each device 78 being aligned.

The external end of each of the axles 82 has attached to it a ratchet wheel 83 (FIG. 2). These ends of the axles 82 also each rotatably carries a reciprocating lever 84 on which is mounted a spring pressed pawl 85 for engaging the teeth of its wheel 83.

The two operating levers 84 are substantially parallel and are connected by a pivotally mounted metal strap 86. One end 87 of one lever 84 extends downwardly to adjacent the rear end of the rack gear 75 and is located between two spaced pins 88 and 89 on this rack 75 so as to provide a lost motion drive for the levers 84.

In order to provide a removal apparatus for ejecting the plurality of patties 90 from the transversely aligned mold openings 19 there is provided a pair of side levers 91 (FIGS. 1 and 2) hingedly connected at their rear ends 92 to the apparatus and carrying at their forward ends a cross bar 93 on which is mounted a series of knockout rings 94 each held by a bolt 103. The rings are equal in number to the plurality of mold openings 19 and positioned directly above the openings when the mold plate 18 has been moved to its fully extended position from its retracted position shown in the drawings. One of the side levers 91 that is adjacent and above the cam plate 42 carries a downwardly extending metal bar 106 provided on its lower end with a flange 95. A helical spring 96 extends from element 91 to a lower flange 97 that is mounted on the side wall 13 of the apparatus. The mounting 98 for the lower flange 97 also carries a resilient rubber bumper 99 which is engaged by the flange 95 when the spring 96 pulls the side levers 91 and knockout rings 94 carried thereby sharply downwardly.

The vertical bar 106 also carries an inwardly extending pin 100 that is adapted to engage a sloped cam slot 101 in the upper edge of the elongated cam plate 42. Adjacent the forward end of this cam slot 101 is an upwardly opening generally vertical slot 102 in the lower operating rack 43.

The operation of the apparatus of this invention as illustrated in the embodiment in the accompanying drawings is as follows:

With the link arm 39 and link 41 in the retracted positions shown the mold plate 18 is in a similarly retracted position with the series of transversely aligned mold openings 19 in communication with their respective fill slots 20 and the two feeding rams 27 in their forward positions where they have just finished applying feeding pressure to force the moldable material, which may be ground meat, under pressure into the mold openings 19 simultaneously to form a series of meat patties 90, here shown as eight.

Upon further movement of the drive mechanism 28–39 the side linkage arm 39 is moved to the right from the position shown in FIGS. 1 and 2 to start the return movements. Because of the lost motion connection provided by the pin 48 and horizontal slot 49 in the lower rack 43 the mold plate 18 begins to move immediately to the right. This moves the mold openings 19 out of communication with their fill slots 20 while the feed rams 27 are still retained in their spring pressed forward positions to continue to apply pressure to the patties 90 within the openings 19.

The forward movement of the side racks 43 causes the upper racks 45 to move rearwardly by reason of the drive pinion gears 47. This causes rearward movement of the cross bar 52 as well as the two pairs of stop bars 53 mounted thereon. The rearward movement of the stop bars 53 thereupon releases the two latch bars 56 so that they spring upwardly thereby permitting the two catches 60 to release their respective threaded collars 66 in the same manner as explained in the above-mentioned copending application. When this occurs the rearward movement of the cross bar 52 engages the rear buttons 68 on the rear end of each bolt 63 to retract the feeder rams 27 to the left as viewed in the drawings as the cross bar 52 on its racks 45 is retracted.

The initial forward movement of the linkage arm 39 causes the pin 48 to move to the forward end of slot 49 and the rear edge 104 of the cam slot 101 to become immediately aligned with the corresponding rear edge 105 of the vertical slot 102. Then when these aligned slots 101 and 102 on continued forward movement reach their forwardmost positions beneath the pin 100 the mold plate 18 is in fully extended position to the right as viewed in the drawings so that the pin 100 is snapped down into the slot 102 and the aligned rear part 105 of the slot 101 forcibly to project the knockout rings 94 into the mold openings 19 to dislodge the patties therefrom simultaneously and arrange them transversely on a support (not shown). With this forwardly projected position of the mold plate 18 the feed rams 27 as explained are in their fully retracted position or to the extreme left from their forward positions in FIGS. 3 and 4.

When the linkage arm 39 then starts to move in the opposite direction or toward the position shown in the drawings the cam plate 42 moves first because of the lost motion slot 49 and the inclined forward surface of the cam slot 101 lifts the pin 100 and thus the bar 106 and by this means the side levers 91 and the attached knockout rings 94 from the mold openings to the position shown in FIG. 2. Then further movement of the drive mechanism and the mold plate 18 to the left causes the two feed rams 27 to be moved forwardly by engagement of the cross bar 52 with the collars 66 to apply pressure from the springs 64 to the feeder rams 27 and thus the ground meat or other material in front of the rams. This movement continues until the stop bars 53 are located above the rollers 58 of the latch bars 56 with the latch bars in retracted position. The flat surfaces 107 on the two catches 60 permit the threaded collar 66 to pass under the catches to the position shown in FIG. 4. As is explained in the above copending application this structure causes spring pressure to be applied on the rams 27 and therefore on the material in front of the rams until the mold plate 18 has been moved out of communication with the fill slots 20.

During the operation of the apparatus during which the drive mechanism including the linkage arm 39 is reciprocated back and forth the engagement of the rack 75 with the pinion gears 74 oscillates the pair of agitator bails 70 back and forth through approximately 180° to and from a horizontal position as shown immediately above the feed rams 27. This serves to dislodge adhered material which is particularly important in the case of an adhesive material such as ground raw meat from the sides defining the hopper bottom sections 16. This constant dislodging causes the meat to fall to the bottom of the hopper so as to be fed automatically and continuously into the mold openings by the reciprocating rams 27.

This reciprocating movement also causes intermittent fractional rotation of the mover devices 78 toward the feed rams 27 which further provides a constant supply of meat or other material for the feed rams. Thus as the drive racks reciprocate back and forth the lost motion spacing of the pins 88 and 89 causes the operating levers 84 to be oscillated intermittently with each oscillation turning the ratchet wheels 83 and thus the devices 78 a fraction of a complete revolution.

Having described my invention as related to the embodiment shown in the accompany drawings, it is my intention that the invention be not limited by any of the details of description, unless otherwise specified, but rather be construed broadly within its spirit and scope as set out in the appended claims.

I claim:

1. Molding apparatus, comprising: supply means including a hopper for retaining a supply of moldable material having a bottom section; partition means dividing said bottom section into a plurality of separate parts; a movable mold adjacent said supply means having a plurality of mold openings therein for simultaneously forming a plurality of molded articles; access passages means extending from said hopper bottom section toward said mold for communicating with said mold openings; means for cyclically moving said mold between a position where said mold openings communicate with said access passage means and a discharge position; feeder means in said supply means movable toward and away from said passage means for forcing said material from said hopper into said mold openings when said openings are in communication with said passage means; force means for moving said feeder means; agitator means in each said bottom section part adjacent a said feeder means movable to dislodge said material from adjacent portions of said hopper, said agitator means comprising a separate agitator between each adjacent pair of said partition means; means for moving said agitator means; and means mounting the separate agitators on said partition means for simultaneous operation including bearings in each said partition means mounting said agitator means for arcuate movement in said hopper bottom section.

2. The apparatus of claim 1 wherein said feeder means comprises a separate feeder in each said bottom section part.

3. The apparatus of claim 1 wherein said means for moving said agitator means comprises gear means for interconnecting said agitator means and said force means, said agitator means is arcuately movable about an axis of oscillation and said gear means comprises a pinion gear attached to said agitator means and a rack gear movable with said force means.

4. Molding apparatus, comprising: supply means including a hopper for retaining a supply of moldable material; a movable mold adjacent said supply means having a mold opening therein for forming a molded article; access passage means for communicating with said mold opening; means for cyclically moving said mold between a position where said mold opening communicates with said access passage means and a discharge position; feeder means in said supply means movable to adjacent said passage means for forcing said material from said hopper into said mold opening when said opening is in communication with said passage means; means for moving said feeder means toward said passage means; a pair of rotatable mover devices in said hopper on opposite sides of said hopper adjacent to said feeder means when said feeder means is adjacent said passage means; and operating means for rotating said mover devices in successive fractional increments of a complete revolution toward said feeder means for urging said material toward said feeder means.

5. Molding apparatus, comprising: supply means including a hopper for retaining a supply of moldable material; a movable mold adjacent said supply means having a plurality of mold openings therein for simultaneously forming a plurality of molded articles; access passage means for communicating with said mold openings; means for cyclically moving said mold between a position where said mold openings communicate with said access passage means and a discharge position; a plurality of feeder means in said supply means movable each in a straight path toward and away from said mold openings passage means for forcing said material from said supply means into all said plurality of mold openings substantially simultaneously when said openings are in communication with said passage means; force means for moving said feeders; means dividing the bottom section of said hopper into a plurality of separate parts each having a said feeder means and a number of passage means therein, said force means comprises a separate drive means for each feeder means, and each drive means for each feeder means comprises a yieldable means for limiting the amount of pressure applied to its said feeder means and thus to said material engaged by said feeder means, said force means including means for moving all said feeder means simultaneously; separate catch means for retaining each feeder means adjacent its access passage means; and separate release means for releasing each catch means after the corresponding mold opening has been moved out of communication with its access passage means.

6. Molding apparatus, comprising: supply means including a hopper for retaining a supply of moldable material; a movable mold adjacent said supply means having a mold opening therein for forming a molded article; access passage means for communicating with said mold opening; means for cyclically moving said mold between a position where said mold opening communicates with said access passage means and a discharge position; feeder means in said supply means movable toward said passage means for forcing said material from said hopper into said mold opening when said opening is in communication with said passage means; means for moving said feeder means toward said passage means; a pair of rotatable mover devices in said hopper adjacent to and on opposite sides of said feeder means; and operating means for rotating said devices toward said feeder for urging said material toward said feeder means, said operating means including means for rotating each said device alternately in successive fractional increments of a complete revolution, and said means for rotating comprises a ratchet wheel and cooperating pawl on each said mover device, and lever means interconnecting said pawls for simultaneous movement thereof.

7. The apparatus of claim 6 wherein there are provided lost motion connecting means between said lever means and said means for moving said feeder means.

8. Molding apparatus, comprising: supply means including a hopper for retaining a supply of moldable material having a bottom section; partition means dividing said bottom section into a plurality of separate parts; a movable mold adjacent said supply means having a plurality of molded openings therein for simultaneously forming a plurality of molded articles; access passage means extending from said hopper bottom section toward said mold for communicating with said mold openings; means for cyclically moving said mold between a position where said mold openings communicate with said access passage means and a discharge position; feeder means in said supply means movable toward and away from said passage means for forcing said material from said hopper into said mold openings when said openings are in communication with said passage means; force means for moving said feeder means; agitator means in each said bottom section part adjacent a said feeder means movable to dislodge said material from adjacent portions of said hopper; means for moving said agitator means; a pair of rotatable mover devices in said mold adjacent to said feeder means; operating means for rotating said devices toward said feeder means for dislodging said material and urging it toward said feeder means in which said operating means includes means for rotating each said device alternately in successive increments of a complete revolution; and means for interconnecting said operating means and said means for moving said feeder means whereby movement of said feeder means causes said rotating of said devices, said means for rotating comprises a ratchet wheel and cooperating pawl on each said device and lever means interconnecting said pawls for simultaneous movement thereof, and lost motion connecting means between said lever means and said means for moving said feeder means.

9. The apparatus of claim 8 wherein said hopper is provided with arcuate bottom side sections in which are located said mover devices.

10. Molding apparatus, comprising: supply means including a hopper for retaining a supply of moldable material; a movable mold adjacent said supply means having a mold opening therein for forming a molded article; access passage means for communicating with said mold opening; means for cyclically moving said mold between a position where said mold opening communicates with said access passage means and a discharge position; feeder means in said supply means movable toward said passage means for forcing said material from said hopper into said mold opening when said opening is in communication with said passage means; means for moving said feeder means toward said passage means; a pair of rotatable mover devices in said hopper on opposite sides of said hopper and adjacent to said feeder means; operating means for rotating said devices toward said feed means for urging said material toward said feeder means; agitator means between said mover devices and adjacent said feeder means movable to dislodge said material from adjacent portions of said hopper, said hopper having a bottom section beneath said mover devices and above said feeder means in which said agitator means is positioned; and means for moving said agitator means comprising gear means for interconnecting said agitator means and said force means, said agitator means being arcuately movable about an axis of oscillation and said gear means comprising a pinion gear attached to said agitator means and a rack gear movable with said force means.

11. The apparatus of claim 10 wherein said hopper is provided with arcuate bottom side sections in which are located said mover devices.

* * * * *